(12) United States Patent
Ohashi et al.

(10) Patent No.: US 7,912,632 B2
(45) Date of Patent: Mar. 22, 2011

(54) NAVIGATION SYSTEM

(75) Inventors: Yasuko Ohashi, Nagoya (JP); Yoshinori Watanabe, Chita-gun (JP); Hidehiko Kawakami, Nagoya (JP)

(73) Assignee: Denso Corporation, Kariya (JP)

( * ) Notice: Subject to any disclaimer, the term of this patent is extended or adjusted under 35 U.S.C. 154(b) by 166 days.

(21) Appl. No.: 11/511,239

(22) Filed: Aug. 29, 2006

(65) Prior Publication Data
US 2007/0067099 A1 Mar. 22, 2007

(30) Foreign Application Priority Data

Aug. 31, 2005 (JP) ................................. 2005-251894
Jun. 6, 2006 (JP) ................................. 2006-157165

(51) Int. Cl.
*G01C 21/00* (2006.01)
*G08G 1/123* (2006.01)
*G06F 17/00* (2006.01)

(52) U.S. Cl. ............ 701/208; 701/1; 701/200; 701/201; 701/202; 701/207; 701/209; 701/210; 701/211; 340/988; 340/995.1; 340/995.17; 340/995.18; 340/995.19; 340/995.21; 340/995.22; 340/995.23

(58) Field of Classification Search ...... 701/1, 200–215; 340/988, 995.1–995.28
See application file for complete search history.

(56) References Cited

U.S. PATENT DOCUMENTS

| | | | | |
|---|---|---|---|---|
| 5,825,306 A * | 10/1998 | Hiyokawa et al. | ............ | 340/988 |
| 5,941,930 A * | 8/1999 | Morimoto et al. | ............ | 701/201 |
| 5,987,375 A * | 11/1999 | Tamai | ............ | 701/200 |
| 6,091,956 A * | 7/2000 | Hollenberg | ............ | 455/456.5 |
| 6,385,535 B2 * | 5/2002 | Ohishi et al. | ............ | 701/209 |
| 6,487,495 B1 * | 11/2002 | Gale et al. | ............ | 701/209 |
| 2002/0002438 A1 * | 1/2002 | Ohmura et al. | ............ | 701/200 |
| 2002/0013658 A1 * | 1/2002 | Tanaka et al. | ............ | 701/209 |
| 2002/0169547 A1 * | 11/2002 | Harada | ............ | 701/211 |
| 2003/0055558 A1 * | 3/2003 | Watanabe et al. | ............ | 701/208 |

(Continued)

FOREIGN PATENT DOCUMENTS

JP A-6-331379 12/1994

(Continued)

OTHER PUBLICATIONS

Office Action mailed on Nov. 24, 2009 from the Japan Patent Office for corresponding application No. 2006-157165 (English translation enclosed).

*Primary Examiner* — Jack Keith
*Assistant Examiner* — Chuong P Nguyen
(74) *Attorney, Agent, or Firm* — Posz Law Group, PLC (57) ABSTRACT

A navigation system stores setting record information related to places designated as destination or reached place. The setting record information includes setting frequencies with which corresponding places were designated. A control unit searches a map database for places meeting a keyword inputted by a user and causes a display unit to present the places in the descending order of their corresponding setting frequencies in the stored setting record information. The user then selects as a destination a certain place from the presented places. The control unit stores the selected certain place to update the setting record information. Thus, the names of places meeting the keyword inputted are directly displayed in the descending order of the setting frequency with which they have been designated in the past. Therefore, the user need not perform an operation to hierarchically select a desired place by region or facility name.

19 Claims, 6 Drawing Sheets

U.S. PATENT DOCUMENTS

2004/0260466 A1 * 12/2004 Ichihara et al. ............... 701/209
2005/0182561 A1 *  8/2005 Yamada et al. ............... 701/209

FOREIGN PATENT DOCUMENTS

| JP | B2-2917856 | 11/1996 |
| JP | A-09-280881 | 10/1997 |
| JP | A-2000-222689 | 8/2000 |
| JP | A-2001-165680 | 6/2001 |
| JP | 2001194176 * | 7/2001 |
| JP | A-2001-194176 | 7/2001 |
| JP | A-2004-077296 | 3/2004 |
| JP | A-2005-106661 | 4/2005 |
| JP | A-2006-003329 | 1/2006 |

* cited by examiner

[PAST RECORD]

| | FAC. | GEN. | D. & H. | WEAT. | OCCUP. |
|---|---|---|---|---|---|
| 1 | NAGOYA CITY HALL | PUBLIC FAC. | 13:00 APR. 17 (MON) | FINE | ONE |
| 2 | NAGOYA A HOTEL | HOTEL | 18:30 APR. 14 (FRI) | RAINY | THREE |
| 3 | NAGOYA AQUARIUM | GARDEN | 10:20 MAR. 28 (SUN) | RAINY | FOUR |
| 4 | NAGOYA A CAFE | REST. | 7:30 FEB. 15 (WED) | FINE | ONE |
| 5 | NAGOYAMA COFFEE SHOP | REST. | 7:50 FEB. 13 (MON) | CLOUDY | ONE |
| 6 | NAGOYA CITY ICE RINK | SPORT | 6:00 DEC. 3 (MON) | SNOW | FOUR |

FIG. 7B

[EXAMPLE 1]

| DISPLAY | |
|---|---|
| NAGOYA AQUARIUM | :HIT BY "WEEKEND" "AM" "RAINY" "FOUR" |
| NAGOYA CITY ICE RINK | :HIT BY "WEEKEND" "AM" "FOUR" |
| NAGOYA A CAFE | :HIT BY "AM" |
| NAGOYAMA COFFEE SHOP | :HIT BY "AM" |
| NAGOYA CITY HALL | :HIT BY PAST RECORD |
| NAGOYA A HOTEL | :HIT BY PAST RECORD |

FIG. 7C

[EXAMPLE 2]

| DISPLAY | |
|---|---|
| NAGOYAMA COFFEE SHOP | :HIT BY "WEEKDAY" "EARLY MORNING" "ONE" |
| NAGOYA A CAFE | :HIT BY "WEEKDAY" "EARLY MORNING" "ONE" |
| NAGOYA CITY HALL | :HIT BY "AM" |
| NAGOYA A HOTEL | :HIT BY "AM" |
| NAGOYA CITY ICE RINK | :HIT BY PAST RECORD |
| NAGOYA AQUARIUM | :HIT BY PAST RECORD |

NAVIGATION SYSTEM

CROSS REFERENCE TO RELATED APPLICATION

The present application is based on and incorporates herein by reference Japanese Patent Application No. 2005-251894 filed on Aug. 31, 2005 and No. 2006-157165 filed on Jun. 6, 2006.

FIELD OF THE INVENTION

The present invention relates to a navigation system that searches for a place desired by a user and presents it.

BACKGROUND OF THE INVENTION

Conventional search methods in navigation systems having a search function are so constructed that, when a place desired by a user is searched for, the following operation is performed: based on an inputted keyword related to the place, the genre of the keyword, areas/regions, and the like related to that place are hierarchically and sequentially displayed; and options to be selected by the user are displayed in the form of list on a hierarchy-by-hierarchy basis.

Therefore, to obtain a desired search result (place names), a user is required to sequentially make selection according to the contents of lists hierarchically and sequentially displayed. For example, the user must perform the following operation: input a keyword related to a place→(a list is displayed)→select an option to be inputted→confirm the input→determine a genre→(a genre list is displayed)→select an option to be inputted→determine a region→select one from among place candidates.

Thus, search methods based on sequential selection involve many steps in operating procedure, and impose a load on users; therefore, these search methods are not always easy to use. To cope with this, there are known various methods for simplifying the operation in these operating methods based on sequential selection. One example is such that the genre under which a place the user previously set as desired place is classified and the names of facilities (or points of interest (POIs)) belonging to that genre are displayed at the top of the list of options in each hierarchy. (Refer to Patent Document 1, for example.)

Patent Document 1: JP-H8-304099 A (JP-297856 B2)

However, the method disclosed in Patent Document 1 involves a problem. Only one genre or facility previously set is displayed at the top of each list of options. Therefore, in cases where the information (place name) displayed at the top of a list of options does not agree with the user's desired information, the user must perform many operations to narrow a search by "area/region" or "genre" just the same as conventional cases.

In cases where the information displayed at the top of a list of options agrees with the user's desired information, the user only has to make a confirmation input using the information displayed at the top. Therefore, the selecting operations to select an option to be inputted for narrowing a search can be reduced. However, since selecting operation must still be hierarchically and sequentially repeated, after all, the steps in operating procedure cannot be significantly reduced.

SUMMARY OF THE INVENTION

It is an object of the invention to provide a navigation system that is user-friendly as much as possible.

According to an aspect of the present invention, a navigation system is provided with the following. An input unit is for a user to input. A navigation unit identifies a current position and navigates based on the identified current position. A search database has data of a place to be searched for. A setting record storage unit stores setting record information related to a place of at least one of a destination and a reached place, which were designated with respect to navigating. A presenting unit presents information. And a control unit performs the following: searching the search database in accordance with a predetermined rule, which directly identifies a place based on a keyword inputted via the input unit; causing the presenting unit to present a search result from the searching in a predetermined precedence order based on the setting record information stored in the setting record storage unit; and storing a place, which is included in the result presented and then selected as a destination via the input unit, in the setting record storage unit so as to update the setting record information.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

1. Overall Configuration of Navigation System

Figure 1:
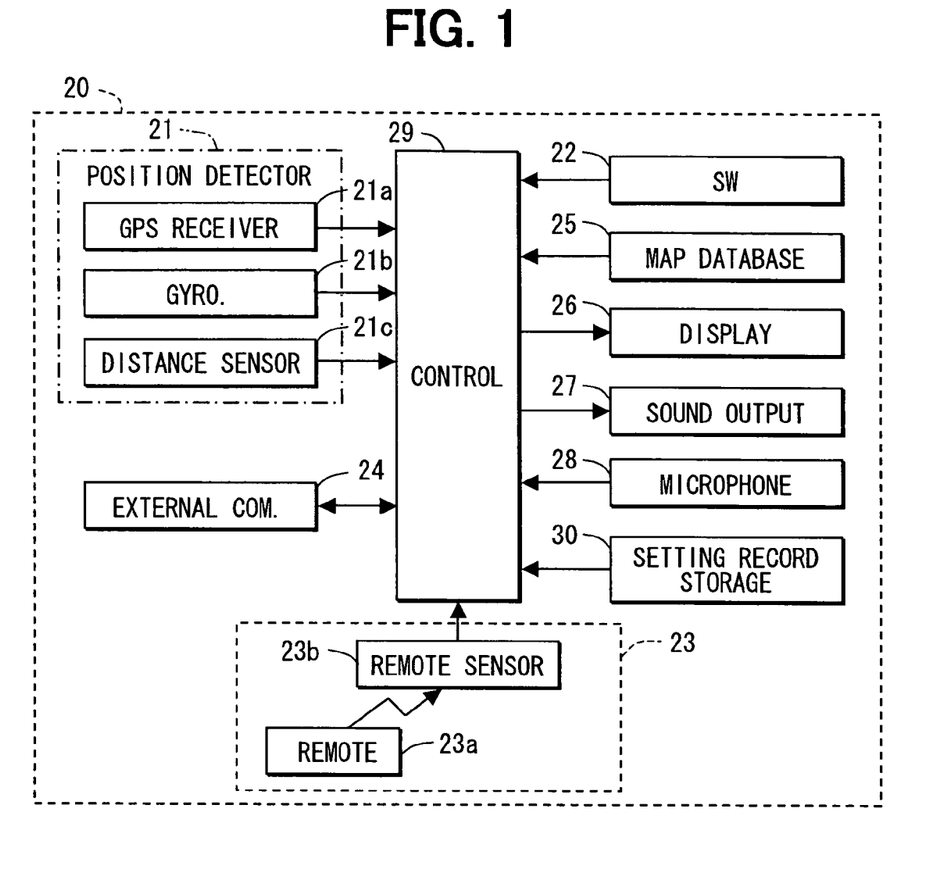
FIG. 1 is a block diagram illustrating the general configuration of a navigation system according to a first embodiment of the present invention.

FIG. 1 is a block diagram illustrating the general configuration of a navigation system 20 as an embodiment.

The navigation system 20 is mounted in a vehicle and includes: a position detector 21 that detects a current position of the vehicle; an operation switch group 22 for inputting various instructions from a user; a remote control terminal 23a that is capable of inputting various instructions like the operation switch group 22 and is separate from the navigation system 20; a remote sensor 23b for inputting signals from the remote 23a (the remote 23a and the remote sensor 23b are collectively designated as remote unit 23); an external communication instrument 24 that is connected to a packet telecommunication network or the like and communicates with external sources; a map database 25 in which map information, speech data, and the like are recorded; a display unit 26 for displaying maps and varied information; a sound output unit 27 for outputting varied audio guidance and the like; a microphone 28 that outputs electrical signals based on speech given out by the user; a control unit 29 that carries out varied processing according to inputs from the above-mentioned position detector 21, operation switch group 22, remote sensor 23b, external communication instrument 24, map database 25, and microphone 28, and controls the external communication instrument 24, display unit 26, and sound output unit 27; and a setting record storage unit 30 that stores information on the record of setting of places set as destination or the like.

2. Description of Each Component

The position detector 21 includes: a GPS receiver 21a that receives radio waves from artificial satellites for GPS (Global Positioning System) through a GPS antenna, not shown, and outputs reception signals; a gyroscope 21b that detects a magnitude of rotational motion applied to the vehicle; a distance sensor 21c for detecting a distance traveled by the vehicle from an acceleration of the vehicle in the longitudinal direction and the like. The control unit 29 computes the position, orientation, speed, and the like of the vehicle based on output signals from the sensor and the like 21a to 21c. There are various methods for determining the current position based on output signals from the GPS receiver 21a. The point positioning method or the relative positioning method may be adopted.

The operation switch group 22 is constructed of: a touch panel constructed integrally with the display surface of the display unit 26; mechanical key switches provided around the display unit 26; and the like. The touch panel and the display unit 26 are laminated and integrated with each other. There are various types of touch panel, pressure sensing type, electromagnetic induction type, capacitance type, and combinations of them. Any of them may be used.

The external communication instrument 24 acquires accident information, traffic jam information, and the like from a VICS information center through light beacons, radio beacons, and the like installed on the roadside.

The map database 25 includes map information (node number, link number, data on road shape, data on road width, road type data, road number, data on traffic restriction, geographical data, mark data, intersection data, facility data (or POI (Point of interest) data), etc.), speech data for guidance, speech recognition data, and the like. It is stored on map information storage media (e.g. hard disk and DVD-ROM), not shown.

The display unit 26 is a color display device, and there are various types of color display devices, liquid crystal display, organic EL display, CRT, and the like. Any of them may be used. The following can be displayed in superposition in the display screen of the display unit 26: display made when a keyword related to a place is inputted in place search; display of a search result; a mark that indicates the current position identified from the current position of the vehicle identified by the position detector 21 and map information inputted from the map database 25; a directed route to a destination, additional data such as names, landmarks, and marks for various facilities or POIs. The display unit is also capable of displaying facility guide and the like.

The sound output unit 27 can output guides to facilities inputted from the map database 25 and varied audio guidance. Further, it can output place search results by speech.

When the user inputs (gives out) his/her speech, the microphone 28 outputs an electrical signal (audio signal) based on the inputted speech to the control unit 29. The user can operate the navigation system 20 by inputting varied speech to the microphone 28. In place search, the user can use this microphone 28 to input a keyword related to a place.

The control unit 29 is constructed based on a publicly known microcomputer composed of CPU, ROM, RAM, SRAM, I/O, and bus lines that connect these items, and the like, not shown, and carries out varied processing, in addition to search and display processing to be described, based on programs stored in the ROM and the RAM.

For example, the control unit 29 carries out route computation processing, routing assistance processing, and the like. In route computation processing, it computes the optimum route from the current position to a destination based on the following: map information stored in the map database 25; and the destination set according to the search result of search and display processing carried out based on a keyword related to a place inputted by the operation of the operation switch group 22, the remote 23a, or the like. In routing assistance processing, the control unit 29 causes the display unit 26 to display the computed route or the sound output unit 27 to output it by speech, and thereby provides routing assistance.

In routing assistance processing, the control unit 29 carries out the following processing: it computes points required for guidance from the result of the above-mentioned route computation and a variety of information contained in the map information such as the shapes of roads, the positions of intersections, and the positions of railroad crossings; it determines what guidance (instruction to turn to the right or turn to the left, and the like, that is, so-called navigation) is required.

The control unit 29 is so constructed that it can also carry out speech recognition processing. A processing unit related to speech recognition and a processing unit related to navigation may be so constructed that they are separated from each other, needless to add. In this example, however, a construction capable of carrying out speech recognition processing is built in the control unit 29.

The setting record storage unit 30 stores information on the record of setting of places set or designated as destination (hereafter, referred to as destination setting record information) and information on the record of setting of places set or designated as reached place (hereafter, referred to as reached place setting record information). For instance, a place designated as a reached place includes (i) a place where designating a reached place is performed via input means such as the operation switch group 22 and/or (ii) a place estimated when a guidance by the navigation system 20 is terminated (e.g., when a guidance ends at a parking lot of a supermarket, the supermarket is estimated as a reached place). The setting record storage unit 30 may be an external storage device such as memory stick, or may be part of the storage area in map information storage media, not shown, where the map database 25 is stored.

3. Description of Processing in Control Unit

Figure 2:
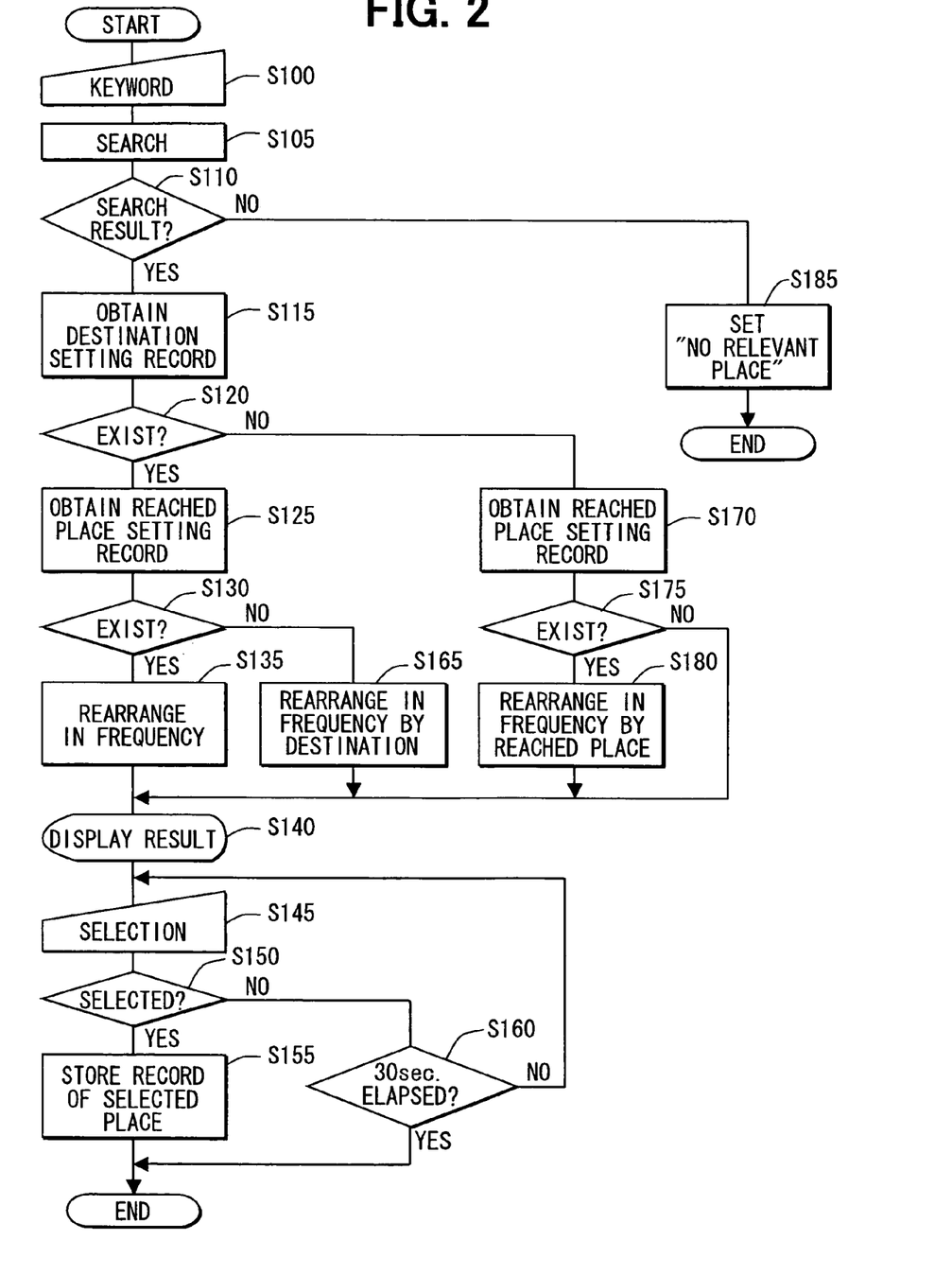
FIG. 2 is a flowchart of the search and display processing in a navigation system according to the first embodiment.
Figure 3:
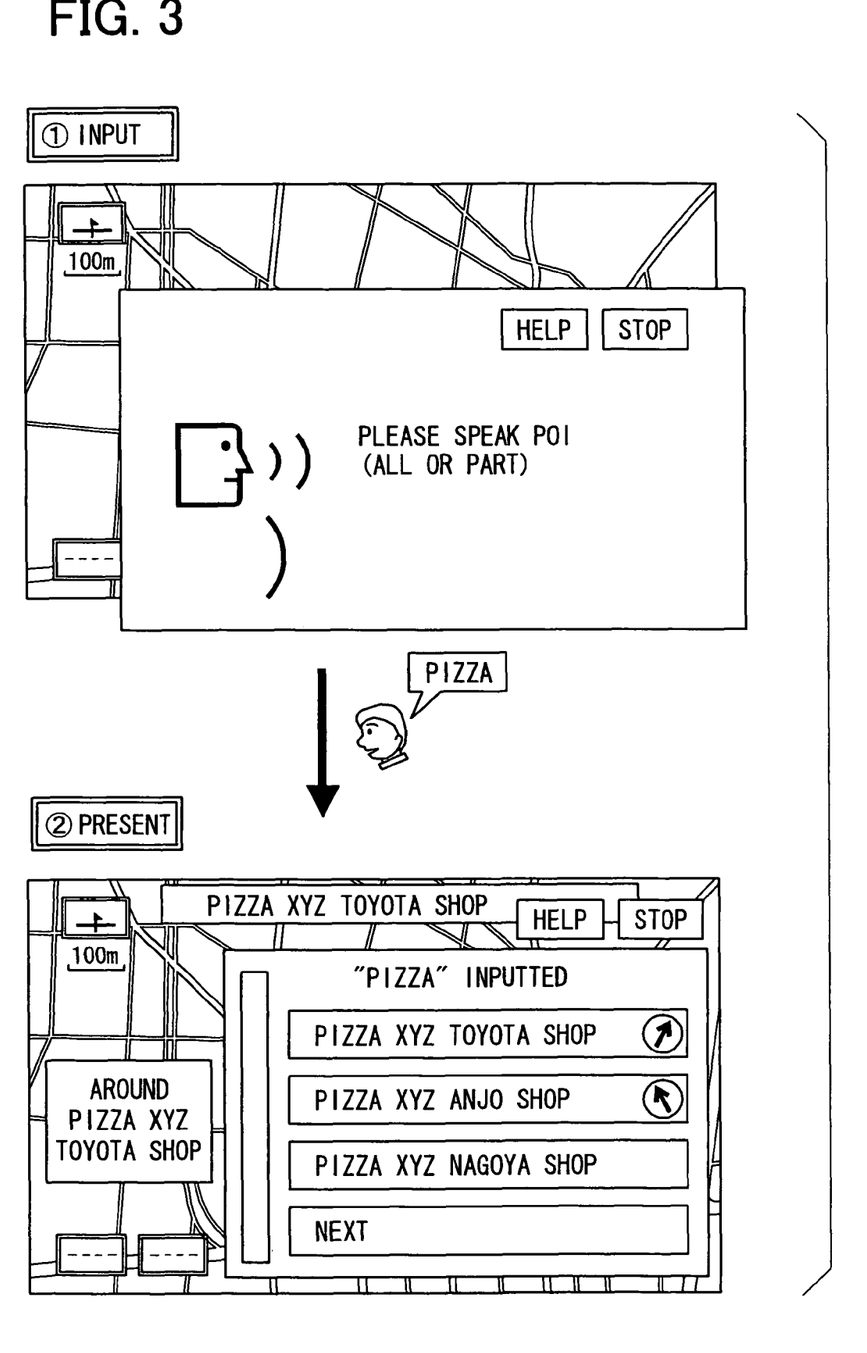
FIG. 3 is an example of a display screen image displayed in the display unit of a navigation system according to the first embodiment.

Description will be given to the search and display processing carried out by the control unit 29 with reference to the flowchart in FIG. 2 and an example of a display screen image in FIG. 3. Description will be omitted with respect to the routing assistance processing and the like carried out in ordinary navigation systems.

This search and display processing is carried out by the control unit 29 when the driver operates an ignition key to bring the vehicle into accessory power supply (ACC) state or turn the key to the engine operation position (ON position).

When the processing is started, at S100, a keyword related to a place or a point of interest (POI) (hereafter, referred to as keyword) is inputted through publicly known speech recognition processing by the user's speech inputted through the microphone 28. The keyword inputted at this time need not fully match with the keyword for a place to be searched for. In cases where the user desires to go to a shop that serves pizza, for example, he/she only has to input "pizza" by speech, as illustrated in FIG. 3. After the completion of input, the control unit 29 proceeds to S105.

At S105, the control unit 29 uses the inputted keyword as search key, and searches the map database 25 for places whose names contain this keyword. The control unit 29 arranges them in the RAM in the alphabetical order, and proceeds to S110. In cases where the keyword is "pizza," for example, the names of facilities (or POIs) containing the word of "pizza" in front are arranged in the alphabetical order as follows: "PIZZA XYZ ANJO SHOP," "PIZZA XYZ NAGOYA SHOP," "PIZZA XYZ TOYOTA SHOP," and so on.

At S110, the control unit 29 determines whether or not a search result was obtained at S105. In cases where there are entries corresponding to the keyword and a search result is obtained (Yes at S110), the control unit 29 proceeds to S115. In cases where there is no entry corresponding to the keyword and a search result is not obtained (No at S110), the control unit 29 proceeds to S185. It sets a message informing that there is "No relevant place," to cause the display unit 26 to display it, and terminates the processing.

At S115, the control unit 29 acquires destination setting record information from the setting record storage unit 30 with respect to each of the place names arranged in the alphabetical order as the result of search at S105. Then, it proceeds to S120, and determines whether or not destination setting record information exists. More specific description will be given. In cases where each of "PIZZA XYZ ANJO SHOP," "PIZZA XYZ NAGOYA SHOP," "PIZZA XYZ TOYOTA SHOP," and so on arranged at S105 has been set as destination or the like in the past, its destination setting record information is stored in the setting record storage unit 30. For this reason, at S120, it is determined whether or not its destination setting record information exists, and it is thereby determined whether or not that shop has been set as destination or the like in the past. In cases where destination setting record information exists (Yes at S120), the control unit 29 proceeds to S125; in cases where destination setting record information does not exist (No at S120), the control unit 29 proceeds to S170.

At S125, the control unit 29 acquires reached place setting record information from the setting record storage unit 30 with respect to each of the place names arranged in the alphabetical order as the result of search at S105. Then, it proceeds to S130, and determines whether or not reached place setting record information exists. More specific description will be given. In cases where each of "PIZZA XYZ ANJO SHOP," "PIZZA XYZ NAGOYA SHOP," "PIZZA XYZ TOYOTA SHOP," and so on arranged at S105 has been set as "place the user has visited," its reached place setting record information is stored in the setting record storage unit 30. For this reason, at S130, it is determined whether or not its reached place setting record information exists, and it is thereby determined whether or not that shop has been set as "shop the user has visited." In cases where reached place setting record information exists (Yes at S130), the control unit 29 proceeds to S135; in cases where reached place setting record information does not exist (No at S130), the control unit 29 proceeds to S165.

"Place the user has visited" is actually the name, address, or the like of a facility that the navigation system 20 estimates to exist in proximity to the position at which the vehicle arrived. It does not mean a "place the user has visited" in a strict sense.

At S135, the control unit 29 rearranges the place names, arranged in the alphabetical order as the result of search at S105, in the descending order of setting frequency, which means a setting count or how many times a place was set as a destination or reached place. In cases where place names have a setting frequency identical to that of each other with respect to the destination setting and with respect to the reached place setting, respectively, the place names are arranged by giving priority to the frequency of destination setting. As a result, the place names arranged in the RAM in the alphabetical order are rearranged in the descending order of the frequency of destination setting and simultaneously in the descending order of the setting frequency of reached place setting. When place names have setting frequencies identical to those of each other with respect to both the destination setting and the reached place setting, the place names are arranged in the alphabetical order.

Description will be given with the above-mentioned pizza shops taken as an example. Of those shops, the "TOYOTA SHOP" is highest in the frequency with which it has been set as destination, and the "ANJO SHOP" and the "NAGOYA SHOP" are identical in the frequency with which they have been set as destination. When the frequency with which the "ANJO SHOP" has been set as reached place is higher than the frequency with which the NAGOYA SHOP" has been set as reached place in this case, the following takes place. (In other words, in cases where the user has visited the "ANJO SHOP" more frequently than "NAGOYA SHOP," the following takes place.) The shop names are arranged in the RAM in the order of "PIZZA XYZ TOYOTA SHOP," "PIZZA XYZ ANJO SHOP," "PIZZA XYZ NAGOYA SHOP," and so on.

After the control unit 29 finishes arranging the shop names as mentioned above, it proceeds to S140. Then, it causes the display unit 26 to display the result of arrangement. At this time, the result of arrangement is displayed in the form of list, and a map of the area around the place that has been most frequently set is displayed together.

Description will be given with the above-mentioned pizza shops taken as an example. As illustrated in FIG. 3, the control unit 29 causes the display unit 26 to display the shop names in the order of "PIZZA XYZ TOYOTA SHOP," "PIZZA XYZ ANJO SHOP," "PIZZA XYZ NAGOYA SHOP," and so on in the form of list. At the same time, it causes the display unit to display a map of the area around the "PIZZA XYZ TOYOTA SHOP" that has been most frequently set.

Meanwhile, in cases where the control unit 29 determines that reached place setting record information does not exist at S130 and proceeds to S165, it carries out the following processing. At S165, it rearranges the shop names, arranged in the alphabetical order as the result of search at S105, in the descending order of the frequency of destination setting, and proceeds to S140. Then, it causes the display unit 26 to display the result of the rearrangement, while displaying a map of the area around the place that has been most frequently set.

Description will be given to the processing carried out in cases where destination setting record information does not exist (No at S120) and the control unit 29 proceeds to S170.

At S170, the control unit 29 acquires reached place setting record information from the setting record storage unit 30 with respect to each of the place names arranged in the alphabetical order as the result of search at S105. Then, it proceeds to S175, and determines whether or not its reached place setting record information exists. More specific description will be given. In cases where each of "PIZZA XYZ ANJO SHOP," "PIZZA XYZ NAGOYA SHOP," "PIZZA XYZ TOYOTA SHOP," and so on arranged at S105 has been set as "place the user has visited," its reached place setting record information is stored in the setting record storage unit 30. For this reason, at S175, it is determined whether or not its reached place setting record information exists, and it is thereby determined whether or not that shop has been set as reached place in the past. In cases where reached place setting record information exists (Yes at S175), the control unit 29 proceeds to S180. In cases where reached place setting record information does not exist (No at S175), the control unit 29 proceeds to S140; then, it causes the display unit 26 to display the search result still in the alphabetical order.

At S180, the control unit 29 rearranges the search result, arranged in the alphabetical order at S105, in the descending order of the frequency of reached place setting. As a result, the place names arranged in the alphabetical order in the RAM are rearranged in the descending order of the frequency of reached place setting. At this time, those identical in the frequency of reached place setting are arranged in the alphabetical order.

Description will be given with the above-mentioned pizza shops taken as an example. Of those shops, the "ANJO SHOP" is highest in the frequency with which it has been set as reached place, followed by the "TOYOTA SHOP." In cases where the other shops are not identical in the frequency with which they have been set as reached place or the other shops have not been set as reached place, the shop names are arranged in the RAM in the order of "PIZZA XYZ ANJO SHOP," "PIZZA XYZ TOYOTA SHOP," and so on.

After the control unit 29 finishes arranging the shop names in the descending order of the frequency of reached place setting, it proceeds to S140. At this time, the result of arrangement is displayed in the descending order of the frequency of reached place setting in the form of list, and a map of the area around the place that has been most frequently set as reached place is displayed together.

Next, after the control unit 29 finishes arranging the shop names and causes the display unit 26 to display the result of arrangement, it proceeds to S145. At S145, the control unit 29 makes the user do selective input, and proceeds to S150. At S150, it determines whether or not selective input has been done. In cases where selective input has been done (Yes at S150), the control unit 29 proceeds to S155; in cases where selective input has not been done (No at S150), the control unit 29 proceeds to S160.

At S160, the control unit 29 determines whether or not 30 seconds have passed. In cases where 30 seconds have passed (Yes at S160), it terminates the processing; in cases where 30 seconds have not passed (No at S160), it returns to S145 and waits for the user to do selective input. At S155, the control unit 29 stores the record of the selected place in the setting record storage unit 30, and terminates the processing.

4. Features of Navigation System According to Embodiments

In the navigation system 20 in the first embodiment, the following operation is performed when a user inputs a keyword related to a place: the genres of the keyword related to the place or the regions in which the place is embraced are not hierarchically displayed. Instead, place candidates for the keyword related to the place are directly presented in the descending order of the frequency with which they were set in the past.

More specific description will be given. When a user just inputs speech of "pizza," place names containing the word of "pizza" are presented in the descending order of the frequency with which they were set as destination or reached place in the past. When the user searches for a destination, therefore, he/she can directly obtain his/her desired search result without sequentially narrowing a search by "genre" or "area/region." This makes the navigation system user-friendly.

When a user inputs a keyword related to a destination, a map of the area around the place the user searches for in an attempt to go there is directly displayed based on the keyword. Therefore, the user can view the map of the area around his/her desired place without performing any other operation for place selection, and this makes the destination easier to recognize. Thus, the navigation system is very user-friendly.

When the result of search for a destination is displayed in the form of map, the search result is also displayed on the display unit 26 in the form of list. Therefore, when the user desires to go to a place other than that displayed in the form of map, he/she can easily select the place and this is convenient to the user.

Second Embodiment

The navigation system in the second embodiment is identical with the above-mentioned navigation system 20 in the first embodiment in configuration. Only the search and display processing carried out by the control unit 29 is different. Therefore, the description of the configuration will be omitted, and description will be given only to the search and display processing.

In the first embodiment, the control unit 29 causes the display unit 26 to display a search result arranged based on frequency information. In the second embodiment, the control unit 29 searches only for places whose frequency information was set in the past six months.

More specific description will be given. When a search result is arranged at S135, S165, and S180 in FIG. 2, places whose frequency information was set earlier than the past six months are omitted. Then, the control unit 29 proceeds to S140, and causes the display unit 26 to display the result of arrangement. In cases where there is no relevant entry at this time, the control unit 29 sets a message informing "No appropriate entry" at S135, S165, and S180, and proceeds to S140. Then, it causes the display unit 26 to display the message.

In this case, destination setting record information and reached place setting record information contain information on time when setting was made (date and time of day), in addition to the frequency of setting.

Thus, search results are presented based on new information, in other words, setting record information of a high degree of freshness. Therefore, the user can easily obtain his/her desired search result, and this makes the navigation system user-friendly Third Embodiment The navigation system in the third embodiment is identical with the above-mentioned navigation system 20 in the first embodiment in configuration. Only the search and display processing carried out by the control unit 29 is different. Therefore, the description of the configuration will be omitted, and description will be given only to the search and display processing.

In the search and display processing in the first embodiment and the second embodiment, retrieved entries are arranged based on frequency information. In the third embodiment, the control unit 29 further arranges these entries in the increasing order of distance to a destination and causes the display unit 26 to display the result of the arrangement.

More specific description will be given. Before a result is displayed at S140 in FIG. 2, the control unit 29 computes the distance from the current position identified by the position detector 21 to each of the places arranged based on setting frequency information. Then, it rearranges the places, arranged based on frequency information, in the increasing order of the computed distance, and causes the display unit 26 to display the result of the rearrangement at S140.

Thus, desired places are presented in the increasing order of distance based on the distance from the current position. This makes the navigation system easy to use to search for the names, addresses, and the like of facilities required to achieve a predetermined purpose.

Fourth Embodiment

Description will be given to a navigation system 40 in a fourth embodiment with reference to FIGS. 4, 5, 6, 7A, 7B, and 7C.

The configuration of the navigation system 40 and its search and display processing are similar to the navigation system 20 (Refer to FIG. 1.) and the search and display processing (Refer to FIG. 2.) in the first embodiment. Therefore, the identical components and the identical processing will be marked with identical reference numbers, and the description of them will be omitted. Description will be given only to different elements.

Figure 4:
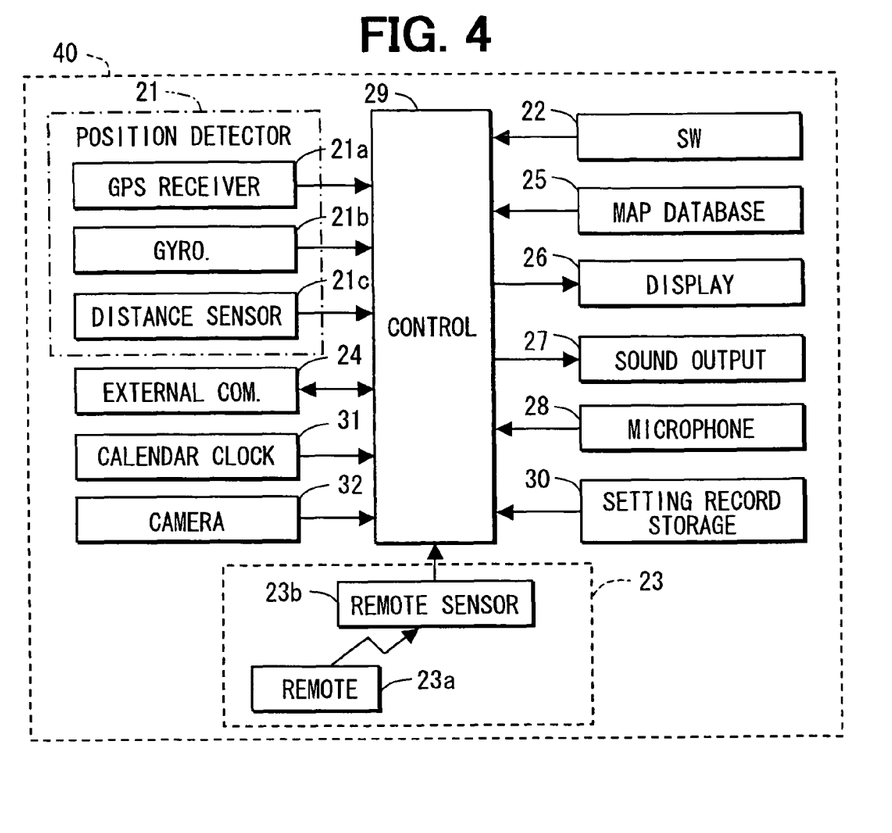
FIG. 4 is a block diagram illustrating the general configuration of a navigation system according to a fourth embodiment.

The navigation system 40 is obtained by adding a calendar clock 31 and an interior camera 32 to the navigation system 20 in the first embodiment.

The calendar clock 31 is for acquiring the situation when a keyword is inputted. When a keyword is inputted through the microphone 28, it outputs the month, the day of the week, the date, and the time of day to the control unit 29.

The interior camera 32 is for acquiring the situation when a keyword is inputted. When a keyword is inputted through the microphone 28, it picks up an image of the vehicle compartment, and outputs it to the control unit 29.

In addition to the functions provided in the first embodiment, the control unit 29 has a function of performing the following operation: when a keyword is inputted through the microphone 28, the month, the day of the week, the date, and the time of day are inputted from the calendar clock 31, and further, information on the weather at that time is inputted through the external communication instrument 24.

Further, when a keyword is inputted through the microphone 28, the control unit 29 causes the interior camera 32 to input an image of the vehicle compartment, extracts the occupants in the vehicle compartment by image processing, and computes the number of the occupants in the vehicle compartment.

Figure 5:
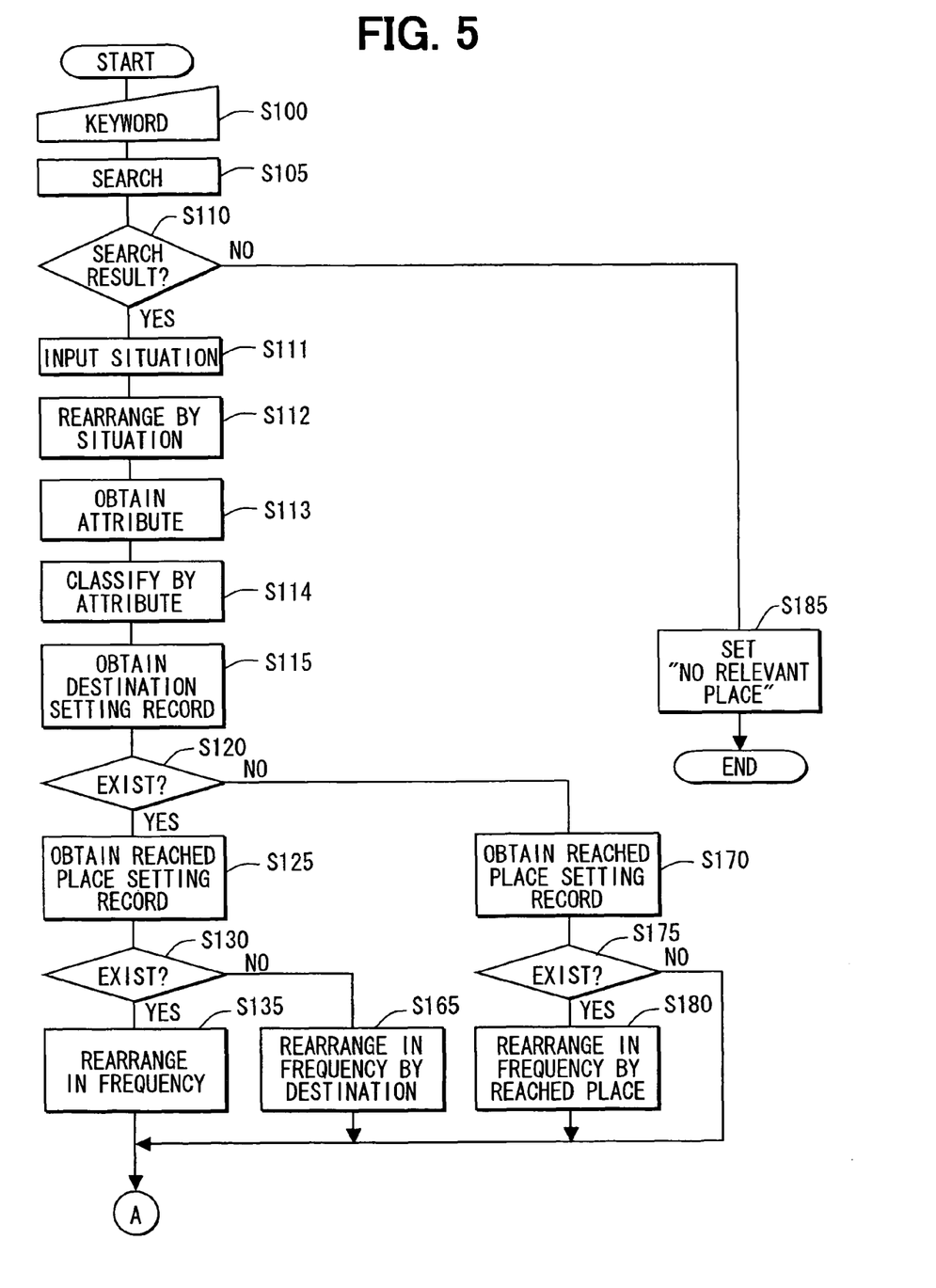
FIG. 5 is a flowchart of the search and display processing in a navigation system according to the fourth embodiment.

Description will be given to the search and display processing carried out by the control unit 29 in the case that a keyword "NAGOYA" is inputted at S100 as an area where a user intends to drive. When the processing is started, the control unit 29 carries out the search control processing of S100 to S110 as in the search and display processing in the first embodiment, as illustrated in FIG. 5. When a search result is obtained at S110, it causes the situation to be inputted at S111.

When the situation is inputted at S111, the month, the day of the week, the date, and the time of day are inputted from the calendar clock 31, and further, the weather is inputted through the external communication instrument 24. At S111, further, the control unit 29 causes the interior camera 32 to input an image of the vehicle compartment, extracts the occupants in the vehicle compartment by image processing, and computes the number of the occupants in the vehicle compartment.

After the input of situation is completed, as mentioned above, the control unit 29 proceeds to S112.

At S112, the control unit 29 rearranges the search result in the descending order of the degree of closeness to the situation inputted at S111, under preset conditions related to situation.

Figure 7A:
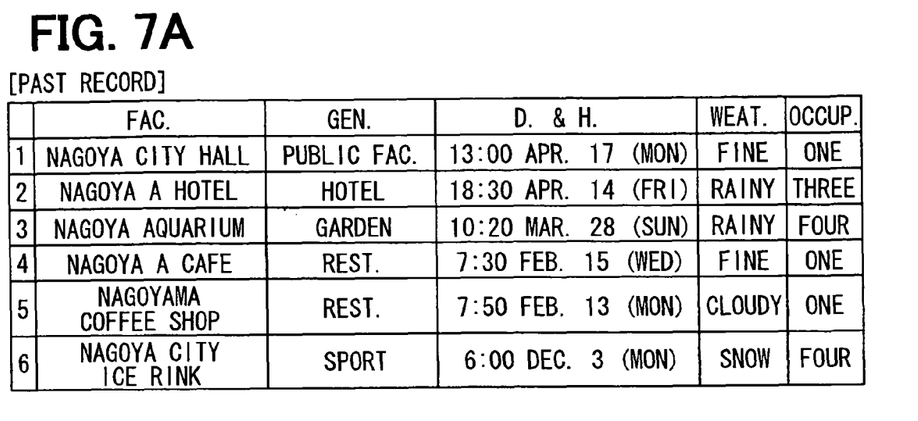
FIGS. 7A to 7C are examples of display screen images displayed in the display unit of a navigation system according to the fourth embodiment.
Figure 7B:
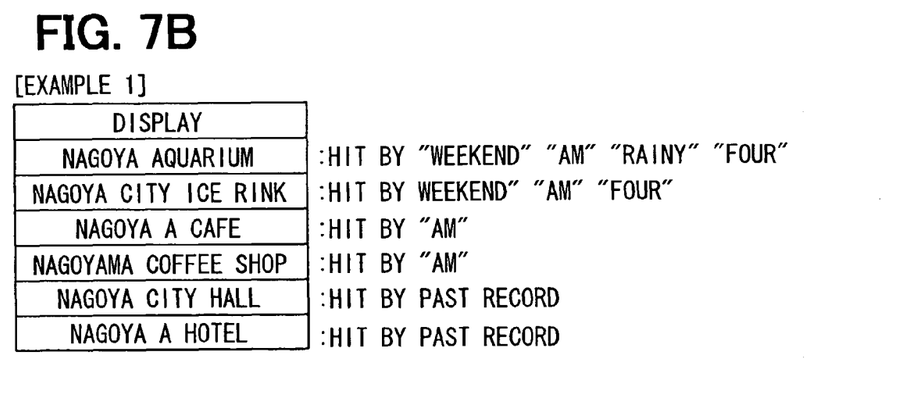

An example will be taken. In cases where the search result, the situation, and the preset conditions related to situation are as described under ($\alpha$) to ($\gamma$) below, the search result is rearranged as illustrated in FIG. 7B. ($\alpha$) Search Result: As illustrated in FIG. 7A. ($\beta$) Situation Inputted at S111: The month, the day of the week, the date, and the time of day are "9:50 on April 22 (Sat.)"; the weather is "rainy"; and the number of occupants is four.

($\gamma$) Preset Conditions Related to Situation: The search result should be prioritized in the order of "weekend," "before noon," and "occupant." That is, the "NAGOYA AQUARIUM," the situation of which is "weekend," "before noon," "rainy weather," and "four occupants," is listed in the fist place; and the "NAGOYA CITY ICE RINK," the situation of which is "weekend," "before noon," and "four occupants," is listed in the second place. Hereafter, the search result is arranged in the descending order of the degree of matching with the conditions, as mentioned above. After the completion of the rearrangement of the search result, the control unit 29 proceeds to S113.

At S113, the control unit 29 acquires the attributes of the search result extracted at S112, and at the subsequent step, or S114, it classifies the search result extracted at S112, by attributes acquired at S113. After the control unit 29 classifies the search result, it proceeds to S115.

At the subsequent steps, or S115 to S135 and S165 to S185, the control unit 29 carries out the same processing as in the first embodiment. When the result of the processing is displayed at S140, such a list as illustrated in FIG. 7A is displayed.

Of the places arranged under the conditions related to situation at S112, "NAGOYAMA COFFEE SHOP" and "NAGOYA A CAFE" are classified under the same genre (that is, they have the same attribute). Since "NAGOYAMA COFFEE SHOP" has been set as destination more frequently than "NAGOYA A CAFE," "NAGOYAMA COFFEE SHOP" is listed at a higher level than "NAGOYAA CAFE."

Figure 6:
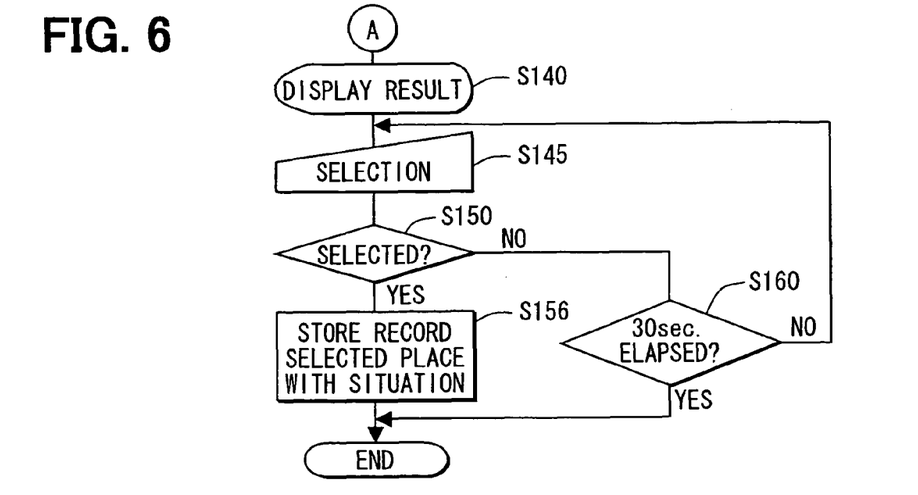
FIG. 6 is a flowchart of the search and display processing in the navigation system according to the fourth embodiment.

Then, the control unit 29 carries out the processing of S145 to S160 excluding S155 as in the first embodiment. At S156 instead of S155, the control unit 29 stores in the setting record storage unit 30 the record of the selected place name while associating with the situation when the keyword was inputted, as selection record information.

In the navigation system 40 constructed as mentioned above, destinations and reached places can be classified according to their attributes when stored. This makes the navigation system user-friendly.

A destination or a reached place is displayed in accordance with the situation in which a keyword was inputted, acquired from the external communication instrument 24, calendar clock 31, and interior camera 32. This makes the navigation system convenient for the user.

Others

Up to this point, description has been given to embodiments of the invention. However, the invention is not limited to these embodiments, and it can be embodied in various modes without departing from the technical scope of the invention.

Some examples will be taken. In the above-mentioned embodiments, a search result is displayed on the display unit 26 with high priority given to the frequency with which places have been set as destination. Instead, a search result may be displayed with high priority given to the frequency with which places have been set as reached place.

The description of the above embodiments takes navigation systems mounted in vehicles as examples. The invention may be embodied as a portable navigation system.

In the above-mentioned embodiments, a user's speech inputted through the microphone 28 is recognized to input a keyword related to a place. Instead, a keyword may be manually inputted by the operation switch group 22.

In the above-mentioned embodiments, place names are arranged in the descending order of the frequency of setting. Instead, they may be arranged in the ascending order of the frequency of setting. This brings about the following effect: a user who desires to occasionally eat pizza at a shop that is not one he/she frequents but he/she has ever visited will be satisfied.

When places are listed not in the increasing order of distance but in the decreasing order of distance, the following effect is brought about: a user who desires to have a little drive before easting pizza will be satisfied.

Figure 7C:
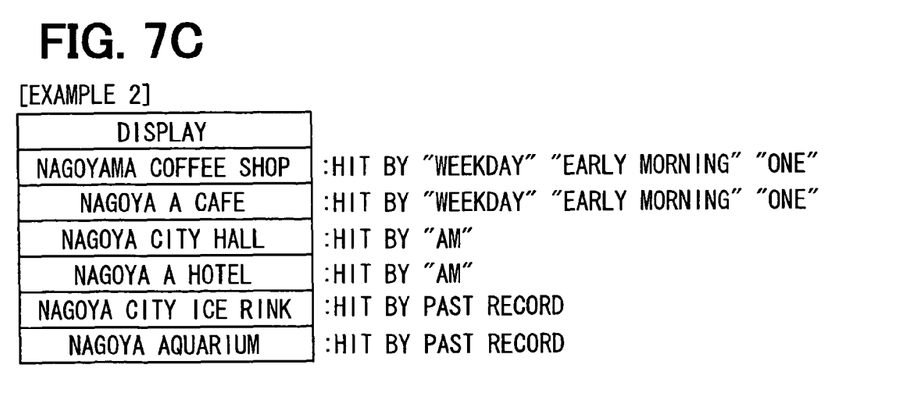

In cases where the situation inputted at S111 of the search and display processing in the fourth embodiment, illustrated in FIG. 5, is that "April 24 (Mon.)," "fair weather," and "one occupant," such display as illustrated in FIG. 7C is made.

At S112 of the search and display processing in the fourth embodiment, illustrated in FIG. 5, a search result is rearranged according to preset conditions related to situation. Instead, only search results that match with situation may be extracted.

Furthermore, a jog-dial or joy-stick can provided as input means, in addition to the operation switch group 22 and the remote unit 23.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system comprising:
an input unit configured to facilitate a user to input a keyword;
a navigation unit configured to identify a current position and to navigate based on the identified current position;
a search database configured to store data of a place to be searched for;
a setting record storage unit configured to store both
(i) destination setting record information, which is related to a place designated as a destination, and
(ii) reached placed setting record information, different from the destination setting record information, the reached place setting record information being related to a place designated as a reached place;
a presenting unit configured to present information; and
a control unit configured to execute a search that searches the search database in accordance with a predetermined rule, which directly identifies a place having a name which contains the keyword inputted via the input unit, the control unit being further configured to
execute a first determination as to whether destination setting record information corresponding to a search result from the executed search is existing by acquiring the destination setting record information stored in the setting record storage unit;
execute a second determination as to whether reached place setting record information corresponding to a search result from the executed search is existing by acquiring the reached place setting record information stored in the setting record storage unit;
cause the presenting unit to present a search result in a predetermined order based on the reached place setting record information when the first determination is negated and the second determination is affirmed;
cause the presenting unit to present a search result in a predetermined order based on both (i) the destination setting record information and (ii) the reached place setting record information, when the first determination is affirmed and the second determination is affirmed, and
store a place, which is included in the search result presented and then selected as a destination via the input unit, in the setting record storage unit as destination setting record information so as to update the destination setting record information.

2. The navigation system of claim 1, wherein
the place designated as the reached place includes (i) a place where designating a reached place is performed via the input unit or (ii) a place estimated when a guidance by the navigation unit is terminated.

3. The navigation system according to claim 1, wherein
the setting record information stored in the setting record storage unit includes a frequency of setting related to a place, and
the control unit is configured to cause the presenting unit to present the search result in a descending order of the frequency of setting included in the setting record information.

4. The navigation system according to claim 3, wherein
when the control unit causes the presenting unit to present the search result in the descending order of the frequency of setting,
the control unit gives a higher priority to the destination setting record information than the reached place setting record information.

5. The navigation system according to claim 3, wherein
when the control unit causes the presenting unit to present the search result in the descending order of the frequency of setting,
the control unit gives a higher priority to the reached place setting record information than the destination setting record information.

6. The navigation system according to claim 1, wherein,
when the setting record storage unit stores the setting record information related to a place, an attribute related to the place is stored together,
the control unit is configured to cause the presenting unit to present the search result based on an attribute related to a place included in the setting record information, and
the control unit is configured to store a place together with the attribute of the place, which is included in the search result presented and then selected via the input unit, in the setting record storage unit as setting record information.

7. The navigation system according to claim 1, wherein
the setting record information stored in the setting record storage unit includes information on time when the setting record information was set, and
the control unit is configured to cause the presenting unit to present the search result while considering the information on time.

8. The navigation system according to claim 1, further comprising:
a situation acquiring unit configured to acquire a situation in which a keyword is inputted, wherein
the setting record storage unit is configured to store as selection record information a situation acquired by the situation acquiring unit in association to the setting record information,
the control unit is configured to cause the presenting unit to present a search result based on selection record information when a certain search of the search database is started based on a certain keyword inputted, which is stored in the setting record storage unit and related to a certain situation acquired by the situation acquiring unit when the certain keyword is inputted, and
the control unit is configured to store a place, which is included in the search result presented and then selected via the input unit, as setting record information in the setting record storage unit, while associating with the certain situation, as selection record information.

9. The navigation system according to claim 1, wherein
the control unit is configured to compute a distance from a current position identified by the navigation unit to a place included in the search result, based on data related to the place included in the search database, and
the control unit is configured to cause the presenting unit to present the search result in an increasing order of the computed distance.

10. The navigation system according to claim 1, wherein
the search database is configured to store map information, which is displayed as a map image by the presenting unit, and
the control unit is configured to cause the presenting unit to present the search result along with a map surrounding a place to be most preferentially presented using map information acquired from the search database.

11. The navigation system according to claim 1, which is mounted in a vehicle.

12. A navigation system comprising:
means for facilitating a user to input a keyword;
means for identifying a current position and for navigating based on the identified current position;
a search database configured to store data of a place to be searched for;
means for storing setting record information including both
(i) destination setting record information which is related to a place designated as a destination, and
(ii) reached place setting record information which is related to a place designated as a reached place, which is different from the destination designated;
means for searching the search database in accordance with a predetermined rule, which directly identifies a place having the inputted keyword;
means for executing a first determination as to whether destination setting record information corresponding to the search result exists by acquiring the stored destination setting record information;
means for executing a second determination as to whether reached place setting record information corresponding to the search result exists by acquiring the stored reached place setting record information;
means for presenting the search result corresponded to by the reached place setting record information in a predetermined precedence order, when the first determination is negated and the second determination is affirmed; and
means for presenting both (i) the search result corresponded to by the destination setting record information and (ii) the search result corresponded to by the reached place setting record information, in a predetermined precedence order, when the first determination is affirmed and the second determination is affirmed.

13. A method for presenting places only upon receiving a keyword from a user in a navigation system, which has a search database for storing data of places to be retrieved and navigates based on an identified current position, the method comprising
storing destination setting record information, which is related to a place designated as a destination;
storing, in addition to the destination setting record information, reached place setting record information, which is related to a place designated as a reached place;
facilitating a user to input a keyword;
searching the search database for a search result, which includes at least one place having a name containing the inputted keyword;
executing a first determination as to whether destination setting record information corresponding to the search result exists by acquiring the stored destination setting record information;
executing a second determination as to whether reached place setting record information corresponding to the search result exists by acquiring the stored reached place setting record information;
presenting,
(a) when the first determination is negated and the second determination is affirmed,
the search result corresponded to by the reached place setting record information
in a predetermined precedence order; and presenting,
(b) when the first determination is affirmed and the second determination is affirmed,
both (i) the search result corresponded to by the destination setting record information and (ii) the search result corresponded to by the reached place setting record information
in a predetermined precedence order.

14. The navigation system of claim 1, wherein
the place designated as the destination is a place selected by the user, or any different user, that is intended to be visited, and
the place designated as a reached place is a place that has been visited.

15. The navigation system of claim 14, wherein
the place designated as the reached place is designated (i) by the user, or any other user, via the input unit, or (ii) by the termination of a guidance by the navigation.

16. The system of claim 12, wherein
the place designated as the destination is a place selected by the user, or any different user, that is intended to be visited, and
the place designated as a reached place is a place that has been visited.

17. The system of claim 16, wherein
the place designated as the reached place is designated (i) by the user, or any other user, inputting the designation, or (ii) by the navigation system terminating guidance.

18. The method of claim 13, wherein
the place designated as the destination is a place selected by the user, or any different user, that is intended to be visited, and
the place designated as a reached place is a place that has been visited.

19. The method of claim 18, wherein
the place designated as the reached place is designated (i) by the user, or any other user, inputting the designation, or (ii) by the navigation system terminating guidance.

* * * * *